(12) United States Patent
Yeom et al.

(10) Patent No.: US 7,485,231 B2
(45) Date of Patent: Feb. 3, 2009

(54) ACTIVATED SLUDGE PROCESS USING DOWNFLOW SLUDGE BLANKET FILTRATION

(75) Inventors: Ik Tai Yeom, Gyeonggi-do (KR); Hyung Soo Kim, Seoul (KR); Young Gyun Choi, Seoul (KR); Yong Hyo Park, Seoul (KR)

(73) Assignees: GS Engineering & Construction Corp., Seoul (KR); SBF Inc., Gyeonggi-do (KR)

(*) Notice: Subject to any disclaimer, the term of this patent is extended or adjusted under 35 U.S.C. 154(b) by 255 days.

(21) Appl. No.: 10/927,741

(22) Filed: Aug. 27, 2004

(65) Prior Publication Data
US 2005/0061739 A1 Mar. 24, 2005

(30) Foreign Application Priority Data
Sep. 24, 2003 (KR) .................... 10-2003-0066150

(51) Int. Cl.
*C02F 3/00* (2006.01)
(52) U.S. Cl. .................... 210/608; 210/620; 210/748
(58) Field of Classification Search .................. 210/608, 210/620, 220, 221.1, 748
See application file for complete search history.

(56) References Cited
U.S. PATENT DOCUMENTS
3,552,571 A * 1/1971 Neuspiel et al. .......... 210/221.2

4,460,470 A * 7/1984 Reimann .................... 210/605
5,800,717 A 9/1998 Ramsay et al.

FOREIGN PATENT DOCUMENTS
JP 58-70884 A 4/1983

(Continued)

OTHER PUBLICATIONS
Grady, L.C.P. & Daigger, G.T., Biological Wastewater Treatment, 2nd Ed., 1999, pp. 193-193, Marcel Dekker, Inc., New York.

(Continued)

*Primary Examiner*—Chester T Barry
(74) *Attorney, Agent, or Firm*—Dorsey & Whitney LLP

(57) ABSTRACT

The present invention relates to an activated sludge process and apparatus for effectively removing organic matters, nutrient salts, particulates, etc. dissolved in sewage/waste water by operating activated sludge process of a high biomass concentration combined with a down-flow solid-liquid separation process utilizing a float-concentrated sludge blanket layer. The present invention provides a process for biologically treating sewage/waste water using activated sludge, comprising the steps of (a) floating a sludge by having micro bubbles rise to form a float-concentrated sludge blanket layer and (b) down-flowing mixed liquor, including activated sludge and solids, into the sludge blanket layer, thereby resulting in a solid-liquid separation and an apparatus for operating the process.

10 Claims, 2 Drawing Sheets

FOREIGN PATENT DOCUMENTS

| | | |
|---|---|---|
| JP | 4-132674 A | 5/1992 |
| JP | 2002-219485 A | 8/2002 |
| KR | 1995-0029198 A | 11/1995 |
| KR | 1999-000593 A | 1/1999 |
| KR | 2002-0044193 A | 6/2002 |

OTHER PUBLICATIONS

Metcalf & Eddy, Inc., Wastewater Engineering Treatment, Disposal, Reuse, 3rd Ed., 1991, pp. 545-551, McGraw-Hill, New York.

Metcalf & Eddy, Inc., Wastewater Engineering Treatment, Disposal, Reuse, 3rd Ed., 1991, pp. 587-589, McGraw-Hill, New York.

Reynolds, T. D. and Richard, P. A., Unit Operations and Processes in Environmental Engineering, 2nd Ed., 1996, pp. 427-432, PWS Publishing Co., Boston.

Stephenson, T., Judd, S., Jefferson, B. and Brindle, K., Membrane Bioreactors for Wastewater Treatment, 2000, pp. 65-79, IWA publishing, London.

\* cited by examiner

ACTIVATED SLUDGE PROCESS USING DOWNFLOW SLUDGE BLANKET FILTRATION

FIELD OF THE INVENTION

The present invention relates generally to the field of biological sewage/wastewater treatment employing an activated sludge process. More particularly, the present invention relates to an activated sludge process and apparatus for effectively removing dissolved organic matters, nutrient salts, particulates, etc. from the sewage/waste water by operating activated sludge process of a high biomass concentration combined with a down-flow solid-liquid separation process utilizing a float-concentrated sludge blanket layer.

BACKGROUND OF THE INVENTION

A population of microorganisms called "activated sludge" are biological solids that play an important role in the biological sewage/waste water treatment process for removing organic matters, nitrogen, phosphorus, etc. from the sewage/wastewater. Efficiency of operation in the sewage water treatment process (i.e., activated sludge process) using an activated sludge is greatly affected by the level of concentration and the amount of the pollutants (including organic matters) in the influent sewage water, the concentration and condition of activated sludge in the reactor, hydraulic retention time, solid retention time, etc. Especially, the concentration of activated sludge is recognized to be a very important factor in a typical activated sludge process as well as an advanced sewage water treatment process including the removal of nitrogen and phosphorus. However, the level of concentration of an activated sludge could not be properly controlled or maintained at a high level by the settling process of the prior art, which is most commonly used among the existing solid-liquid separation processes. Especially, the settling process has several problems involving intermittently occurring sludge bulking, re-floatation of activated sludge due to nitrogen gas generated from the settling tank through the denitrification procedure, resulting in a reduction of efficiency of the solid-liquid separation and a loss of the excess activated sludge.

Heretofore, to operate a high biomass concentration of activated sludge process, the followings have been developed: a membrane bioreactor (MBR) process using submerged separation membrane, a pure oxygen aeration process, a media-chargeable biofilter process, which is the representative attached organisms' treatment process, and etc. In activated sludge processes, the maintenance of high concentrations of microorganisms will make an improvement in the processing capacity for organic matters in the aeration tank and, thus, an increase in the loading rate of organic matters (per unit volume), resulting in a possibility of reduction in volume of the aeration tank of up to 50~75% and of the significant reduction in the required area accordingly. Also, in these cases, the efficiency to remove ammonia nitrogen may be maximized since the nitrification rate will be enhanced by virtue of the increase in the concentration of nitrification microorganisms. Moreover, it is expected that the amount of excess produced sludge is to decrease, since the F/M (food to microorganisms) ratio will be lower and thus self-oxidation will vigorously progress. However, for the processes such as MBR process and biofilter process, the initial cost will be high due to the purchase of membranes or media as well as, in longer operations, the clogging of membranes by an activated sludge or a secretion thereof occurs and thus a loss of pressure increases. Under this circumstance, the membrane should be washed or back-washed periodically. For the aeration process using pure oxygen, it is known that it is impossible to stably operate the aeration process and also it is difficult to maintain a concentration of the microorganisms in a aeration tank of more than 8,000 mg/L since a very good precipitation of activated sludge should be ensured in order to maintain the concentration of activated sludge at a high level. For the aeration process, additional costs are also required to supply pure oxygen.

SUMMARY OF THE INVENTION

Accordingly, it is an object of the present invention to provide an economic and efficient activated sludge process with high biomass concentration using a down-flow sludge blanket layer filtration, thereby decreasing the volume of bioreactor required for the removal of organic matters, nitrogen and phosphorus, and raising the loading rate of the influent pollutant for effective operation and significantly resolving the problems of the settling of the prior art.

To accomplish these and other objects, the present invention provides a process for biologically treating sewage/waste water using activated sludge, comprising the steps of:
  (a) floating a sludge by having micro bubbles rise to form a float-concentrated sludge blanket layer; and
  (b) down-flowing mixed liquor, including activated sludge and solids, into the sludge blanket layer, thereby resulting in a solid-liquid separation.

According to one embodiment of the present invention, after the step (b), the process of the present invention may further comprise the step (c) of returning some of the float-concentrated sludge into the activated sludge reaction tank.

According to another embodiment of the present invention, after the step (c), the process of the present invention may further comprise the step (d) of discharging some of the float-concentrated sludge.

Also, the present invention provides an apparatus for solid-liquid separation of an activated sludge, the apparatus comprising:
  (a) an activated sludge reaction tank for introducing sewage/waste water; and
  (b) a sludge-filtering tank for solid-liquid separation of the sludge from the activated sludge reaction tank, the sludge-filtering tank including a micro-bubbles generation means for generating micro-bubbles to float the activated sludge solids mixed liquor entering therein, if necessary, at least one sludge returning means for returning some of the float-concentrated sludge into the activated sludge reaction tank to maintain the concentration of the activated sludge at a high level and, if necessary, at least one sludge discharge means for discharging the sludge to maintain the proper concentration of the activated sludge in the activated sludge reaction tank.

As mentioned above, the process according to the present invention makes it possible to maintain a relatively high concentration of microorganisms in an activated sludge reaction tank by using a down-flow sludge blanket layer filtration, which makes it possible to stably separate the sludge into solids and liquid independently of the conditions of the sludge, as well as, if necessary, to apply to any biological sewage/wastewater treatment, including processes for biologically removing nitrogen and phosphorus, due to an easier concentration-control of microorganisms in the reactor (see FIG. 2).

DETAILED DESCRIPTION OF PREFERRED EMBODIMENTS

Any publications referenced herein are hereby incorporated by reference in this application in order to more fully describe the state of the art to which the present invention pertains.

As used herein, the term "activated sludge solids mixed liquor" or "mixed liquor" should be understood as including activated sludge, solids or mixture of these.

The present invention now will be described more fully hereinafter with reference to the accompanying drawings, in which the preferred embodiments of the invention are shown.

Figure 1:
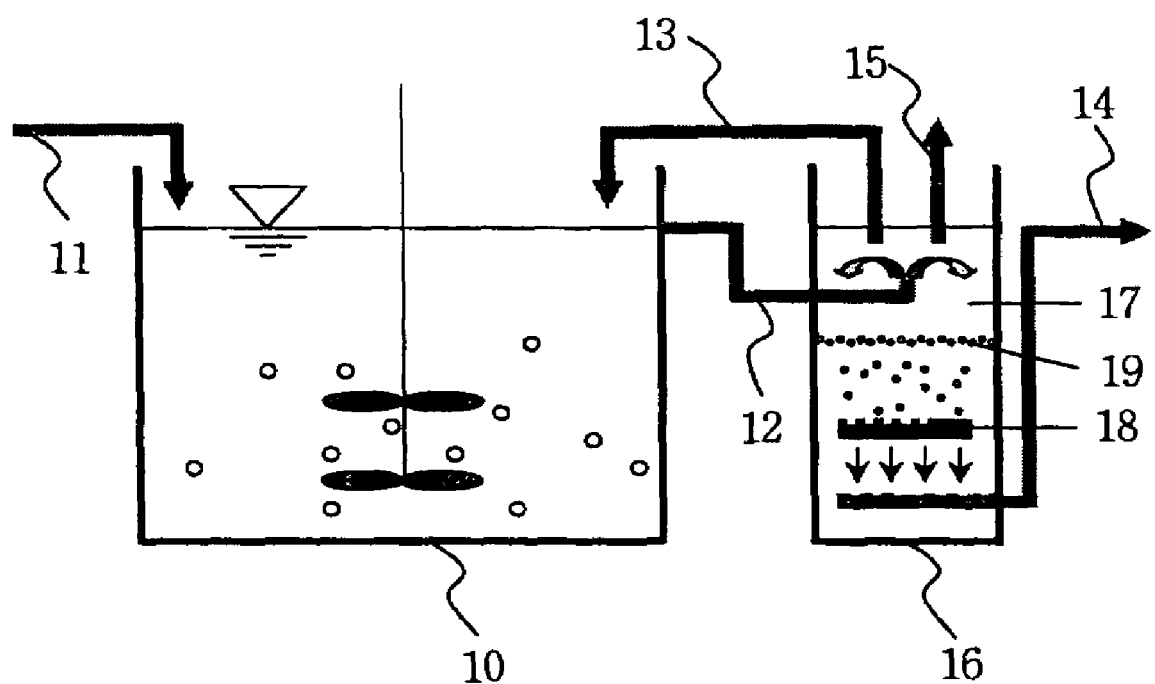
FIG. 1 is a schematic representation of one embodiment according to the process and apparatus of the present invention using the float-concentrated sludge blanket layer.

Referring to FIG. 1, shown therein is an apparatus made in accordance with a preferred embodiment of the invention. The apparatus has an activated sludge reaction tank 10, into which the effluent from a primary settling tank or solid-liquid separation tank (not shown) is introduced via line 11, and a sludge-filtering tank 16. The effluent, introduced into the activated sludge reaction tank 10, is firstly treated by a high concentration of activated sludge, i.e., microorganisms residing in the tank 10. The activated sludge reaction tank 10 may be provided with stirrer(s) 20 to sufficiently contact the pollutants having organic matters with activated sludge in the tank 10 and homogenizing the mixture therein. Preferably, the concentration of activated sludge is kept as high as possible within the allowable range, which is recognized by those skilled in the art.

The mixed liquor from the activated sludge reaction tank 10 is transferred into a sludge-filtering tank 16 via line 12.

During or before the transfer of the activated sludge solids mixed liquor into the sludge-filtering tank 16, a large quantity of micro-bubbles are generated upwardly by a micro-bubbles generator 18 at the lower end of the sludge-filtering tank 16 and, thus, are contacted with the mixed liquor entering the sludge-filtering tank 16 downwardly. Alternatively, the mixed liquor, having already entered the sludge-filtering tank 16, can be floated by a large quantity of micro-bubbles 19 being generated upwardly. A large quantity of micro bubbles 19 can be generated, for example, by electrolysis or a pressurized floatation method or apparatus, or any other method or means that can generate a large quantity of micro-bubbles. Then, the micro-bubbles 19 being generated upwardly and the mixed liquor entering the filtering tank 16 contact with each other in the upper zone of the sludge-filtering tank 16 and float the activated sludge flock onto the water surface. This results in a float-concentrated activated sludge blanket layer 17 as shown in FIG. 1 within one hour after the operation. During this course, the micro-bubbles 19, being generated upwardly, tend to make the mixed liquor entering the filtering tank 16 float while the mixed liquor tends to settle down by the effect of gravity. As a result, a portion of the mixed liquor forms the float-concentrated sludge blanket layer 17 and the reminder and a portion of the activated sludge solids mixed liquor newly entering the layer 17 is separated into solid (i.e., sludge) and liquid (i.e., treated water) by a dynamic filtering action by the layer 17.

Thereafter, the filtered water, or treated water, which has passed through the float-concentrated sludge blanket layer 17 is withdrawn from the lower end of the filtering tank 16 via line 14 and a portion of the sludge separated by the solid-liquid separation is returned into the activated sludge reaction tank 10 via return line 13 in order to maintain a uniform concentration of solid in the activated sludge reaction tank 10. On the other hand, if the concentration of solid in the activated sludge reaction tank 10 is higher than the concentration to be maintained, a portion of the sludge may be discharged via sludge discharge line 15.

In one embodiment of the present invention, various types of weir for automatic discharge of the sludge can be installed on the upper end of the filtering tank 16.

By the present invention, once the float-concentrated sludge blanket layer 17 is formed in the filtering tank 16, the micro-bubbles 19 are used mainly to sustain the layer 17. Even in the event that a portion of the activated sludge is removed from the float-concentrated sludge blanket layer 17, the activated sludge is not included in the effluent since the upwardly generating micro-bubbles again make the activated sludge leaving the layer 17 float. Thus, the SS (suspended solids) removal achieved by the present invention is much higher than that achieved by the typical activated sludge process. Moreover, since the micro-bubbles are used only to sustain the interface between the sludge blanket layer 17 and its lower region except for the beginning of the operation of it, the process of the present invention requires at most ½ the power supply compared to the conventional floatation-separation process. Also, the process of the present invention has a much lower initial installed cost as well as maintenance cost than some of the above-mentioned activated sludge processes with a high biomass concentration. Accordingly, the process of the present invention is an economic over the activated sludge process of the prior art.

Table 1 below shows the advantageous effects of the present invention over the prior art, e.g., MBR process, pure oxygen activated sludge process and biofilter process on MLSS (mixed liquor suspended solids) of the activated sludge reaction tank, the proper loading of organic matters, the removal efficiency of organic matters, the SS (suspended solids) of the effluent water, etc. in operating the high concentration of an activated sludge process.

TABLE 1

Comparisons of operation conditions and treatment efficiencies at various high biomass concentrations of activated sludge processes (see Metcalf & Eddy, Inc., Wastewater Engineering: Treatment, Disposal, Reuse, 3rd Ed., pp. 545-551, McGraw-Hill, New York, 1991; Stephenson, T., Judd, S., Jefferson, B. and Brindle, K., Membrane Bioreactors for Wastewater Treatment, pp. 65-79, IWA publishing, London, 2000)

|  | MBR process | Pure oxygen activated sludge process | Biofilter process | High rate aeration process | Present invention |
|---|---|---|---|---|---|
| MLSS of reaction tank (mg/L) | 7,000~15,000 | 3,000~8,000 | — | 4,000~10,000 | 5,000~12,000 |
| BOD volumetric loading rate (kgBOD/m$^3$ · day) | 0.2~1.2 | 1.6~3.2 | 0.08~1.6 | 1.6~16 | 0.2~12 |
| F/M ratio (kgBOD/kgMLSS · day) | 0.05~0.5 | 0.25~1.0 | — | 0.4~1.5 | 0.05~1.0 |
| Return rate of sludge (%, for inflow) | — | 25~50 | — | 100~500 | 25~50 |
| Organic matters removal (%) | >95% | 85~95 | 65~90 | 75~90 | >95% |
| SS removal (%) | >95% | 85~95 | 65~90 | 75~90 | >95% |

Where an activated sludge process or advanced sewage treatment process involving a high concentration of microorganisms is stably operated by the present invention, the volume of the activated sludge reaction tank can be decreased or the amount of influents and the loading rate of pollutants can be increased. In most sewage/waste water treatment plants where an activated sludge process is operated, the bulking of sludge or the formation of micro floc often make the operation of the plant to be difficult or halted.

The present invention is intended to completely improve the instability in a sewage/waste water treatment plant. Also, the present invention is intended to improve the biological removal of organic matters, the nitrification, the de-nitrification, the removal of phosphorus and the removal of other pollutants by maintaining the concentration of microorganisms in an activated sludge reaction tank 10 at a level equal to or more than three times the concentration, ranging from 2,000 to 4,000 mg/L, of the typical activated sludge processes. For this, the present invention includes initially forming a sludge blanket layer 17 with high biomass concentration of about 15,000 to 30,000 mg/L by using micro-bubbles 19, maintaining an interface between the float-concentrated sludge blanket layer 17 and its lower region, and re-floating the particles detached from the float-concentrated sludge blanket layer 17 to ensure a good quality of effluent water. A portion of the activated sludge, concentrated in the upper region of the float-concentrated sludge blanket layer 17, returns to the activated sludge reaction tank 10, resulting in a stable maintenance in the concentration of microorganisms therein. In addition, the remaining sludge, which is discharged from the layer 17 to maintain the proper solids concentration and solids retention time (SRT) in the activated sludge reaction tank 10, contains a large quantity of micro bubbles 19 and therefore has excellent dewatering properties, resulting in the decrease in final disposal cost.

Figure 2:
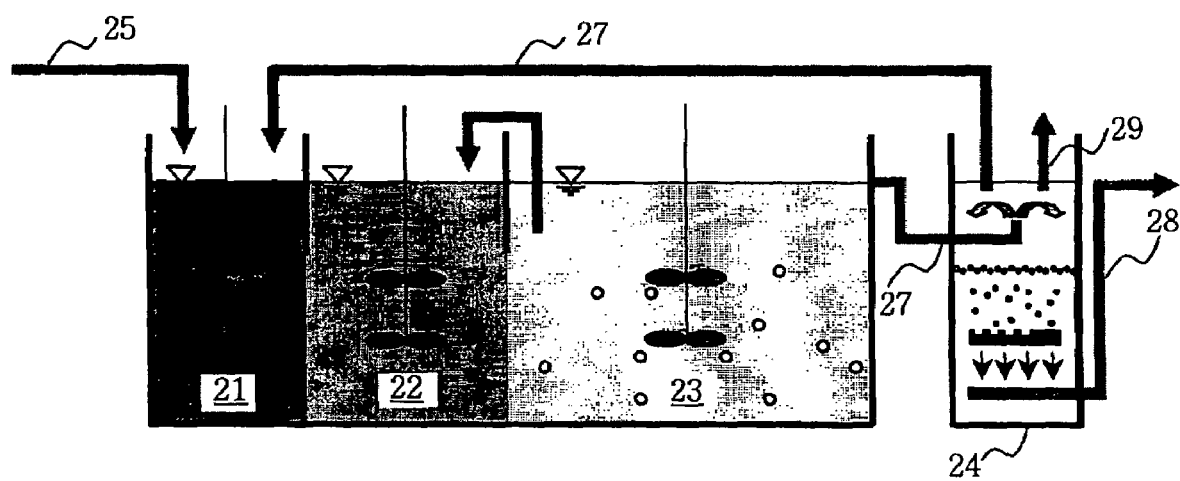
FIG. 2 is a schematic representation of another embodiment according to the process and apparatus of the present invention combined with A2O process.

FIG. 2 illustrates an example of a high biomass concentration of an enhanced activated sludge treatment process combined with the process of the present invention. The high biomass of an enhanced activated sludge treatment process will not be described here since it was sufficiently described above and can be recognized by those skilled in the art. In FIG. 2, the reference number 21 stands for an anaerobic tank, the reference number 22 stands for an anoxic tank, the reference number 23 stands for an aeration tank, the reference number 24 stands for a sludge-filtering tank, the reference number 25 stands for an influent line of raw water, the reference number 26 stands for an internal return line for nitrification solution, the reference number 27 stands for a return line for concentrated sludge and the reference number 28 stands for a treated water withdrawal line. Sludge filtering tank 24 shown in FIG. 2 should be understood to be almost equal to the sludge filtering tank 16 shown in FIG. 1 and also the anaerobic tank 21, the anoxic tank 22 and the aeration tank 23 shown in FIG. 2 should be understood to be an embodiment of activated sludge reaction tank 10 shown in FIG. 1.

EXAMPLES

The process according to one embodiment of the present invention was carried out under the following operation conditions (see FIG. 2). Table 2 below shows the quality of the effluent water in a high biomass concentration of anaerobic/anoxic/aerobic process combined with the process of the present invention and Table 3 below shows comparison between the solid-liquid separation of the present invention and that of the settling process of the prior art.

Operation Conditions:
  Subject to be treated: the effluent water from the primary settling process;
  Location: the sludge-filtering tank 24 according to the present invention was provided in the rear end of the aeration tank 23;
  Specification and concentration of the aeration tank 23: 2000 mm(W)×2000 mm(L)×3000 mm(H) (retention time: 3 hours) and MLSS of 4,000~6,000 mg/L, respectively;
  Amount of the inflowing water into the tank 24: 43.0~63.8 (average 59.0) m$^3$/day;
  Specification of the tank 24: 1000 mm(W)×1500 mm(L)×1800 mm(H) (effective water depth: 1500 mm);
  Load of the inflowing solids into the tank 24: 24~40 kg/m$^2$/hr;
  Surface loading of the tank 24: 60~100 m$^3$/m$^2$/day;

Concentration of the float-concentrated sludge in the tank 24: 15,000~25,000 mg/L; and SS concentration of treated water: 4.8~10.8 (average 6.8) mg/L.

TABLE 2

The quality of the effluent water in a high biomass concentration of anaerobic/anoxic/aerobic process combined with the process of the present invention

| | BOD (mg/l) | COD (mg/l) | SS (mg/l) | TN or TP (mg/l) |
|---|---|---|---|---|
| The present invention | ≦10 | ≦30 | ≦10 | TN: ≦10<br>TP: ≦1 |

BOD = biological oxygen demand;
COD = chemical oxygen demand;
SS = suspended solids;
TN = total nitrogen; and
TP = total phosphorus.

TABLE 3

Comparison between the solid-liquid separation of the present invention and that of the settling process of the prior art (see Metcalf & Eddy, Inc., Wastewater Engineering: Treatment, Disposal, Reuse, 3$^{rd}$ Ed., pp. 587-589, McGraw-Hill, New York, 1991)

| | MLSS in bioreactor (mg/l) | Surface loading (m$^3$/m$^2$/day) | Solids loading (kg/m$^2$/hr) | SS of treated water (mg/l) | |
|---|---|---|---|---|---|
| Settling process (prior art) | 3,000~4,000 | 16~32 | 4~6 | 10~20 | Bulking and re-floatation of sludge occur. |
| The present invention | 4,000~8,000 | 60~100 | 25~40 | 5~10 | The concentration process is not required. |

As described above, the present invention provides a water treatment process and apparatus for effectively removing organic matters, nutrient salts, particle-type materials and the like in sewage/wastewater and also is expected to have the following advantages:

Firstly, according to the present invention, it is advantageous to maintain the MLSS concentration in the activated sludge reaction tank 10 at a desired high level due to a stable solid-liquid separation of the high biomass concentration of biological solids. Also, according to the present invention, in the case that the concentration of microorganisms in the activated sludge reaction tank 10 is maintained at a high level, it is possible to operate the process of the present invention under the condition of a high volumetric loading and organic matters loading as given in Table 1 above and, therefore, to shorten the hydraulic retention time (HRT) in the activated sludge reaction tank 10.

Moreover, a high-rate aeration process of the prior art requires a sludge returning rate of about 100~500% per influent flow in order to maintain the MLSS concentration at the level of about 4,000~10,000 mg/L (see e.g., Reynolds, T. D. and Richard, P. A., Unit Operations and Processes in Environmental Engineering, 2$^{nd}$ Ed., pp. 427-432, PWS Publishing Co., Boston, USA, 1996) while the process of the present invention (i.e., the float-concentrated process of the present invention) requires much less sludge returning rate over the prior art, thereby improving the instability of the biological reaction due to the hydraulic change.

Secondly, the present invention could increase the concentration of microorganisms in the activated sludge reaction tank 17 by sludge return via line 13 and, thus, increase the concentration of nitrification microorganisms, resulting in an increase in the removal rate of ammonia nitrogen or the nitrification rate. Also, when the present invention is applied to the advanced treatment process such as nitrogen.phosphorus removal, their combination process make it possible to improve the removal rate of nitrogen.phosphorus due to an increase in the microorganisms in the reactor.

Thirdly, another advantage of the present invention is that the auto-oxidation of the microorganisms is facilitated. This is because the amount of inflow organic matters is less than that of the heterotrophic microorganisms that are maintained at a high level and thus, the F/M (feed to microorganisms) ratio decreases accordingly. Most of the auto-oxidized microorganisms are SBCOD (slowly biodegradable COD; Grady & Daigger, Biological wastewater treatment, 2$^{nd}$ Ed., pp. 193-194, Marcel Dekker, Inc., 1999), these are transformed into RBCOD (readily biodegradable COD) through hydrolysis and subsequently are taken up by other heterotrophic microorganisms, resulting in the reduction of the production of excess sludge. Thus, it is anticipated that the cost for disposal of sludge will be decreased, according to the present invention.

Fourthly, still another advantage of the present invention is that a down-flow solid-liquid separation process according to the present invention does not require portions or all of the subsequent processes such as a gravity thickening, centrifugal thickening, GBT (gravity belt thickening), etc. since a solid-liquid separation and a thickening of the sludge are carried out simultaneously. Therefore, the costs required to thicken the sludge can be reduced or not be required at all. Furthermore, since the concentrated sludge contains a large quantity of micro-bubbles, dewaterability of the sludge in direct dewatering of a secondary (surplus) sludge is improved.

Fifthly, according to the present invention, the area of land required for wastewater treatment can be substantially decreased due to the reduction of the volume of the activated sludge reaction tank and the absence of a required settling tank. While the settling tank using gravitational action demands a larger area of land and a longer retention time for treating the sludge, the filtering tank by the present invention demands a surface area loading rate of about more than two to three times and the retention time of equal or less than 30 minutes over the settling tank. Thus, the present invention could make it possible to significantly decrease the area of land required for wastewater treatment. Also, from the present invention, the dynamic filtration in the filtering tank and the re-floating of the departed solids make it possible to maintain a concentration of the particle-type of effluent equal to or less than 5 mg/L.

As mentioned above, although the present invention is described by referring to the examples, those skilled in the art will understand that there could be various changes and modifications of the present invention without departing from the scope and spirit of the following claims.

What is claimed is:

1. A process for biologically treating sewage/wastewater using an activated sludge reaction tank and a sludge filtering tank, comprising the steps of:
    (a) floating sludge by generating micro-bubbles within the sludge filtering tank to form a float-concentrated sludge blanket layer as a filtration media; and
    (b) down-flowing mixed liquor, including activated sludge and solids, into the sludge blanket layer, thereby resulting in a solid-liquid separation.

2. The process according to claim 1, further comprising the step of (c) returning some of the float-concentrated sludge formed in the sludge filtering tank into the activated sludge reaction tank.

3. The process according to claim 1, further comprising discharging some of the float-concentrated sludge.

4. The process according to claim 1, wherein the micro-bubbles are continuously generated.

5. The process according to claim 1, wherein the float-concentrated sludge blanket layer is formed by generating micro-bubbles and then introducing predetermined amounts of activated sludge and/or solids into the sludge filtering tank.

6. The process according to claim 1, wherein the micro-bubbles are generated by means of electrolysis or a pressurized floatation method.

7. The process according to claim 2, further comprising discharging some of the float-concentrated sludge.

8. The process according to claim 2, wherein the micro-bubbles are continuously generated.

9. The process according to claim 2, wherein the float-concentrated sludge blanket layer is formed by generating micro-bubbles and then introducing the predetermined amounts of activated sludge and/or solids into the sludge filtering tank.

10. The process according to claim 2, wherein the micro-bubbles are generated by means of electrolysis or a pressurized floatation method.

* * * * *